United States Patent Office 2,996,041
Patented Aug. 15, 1961

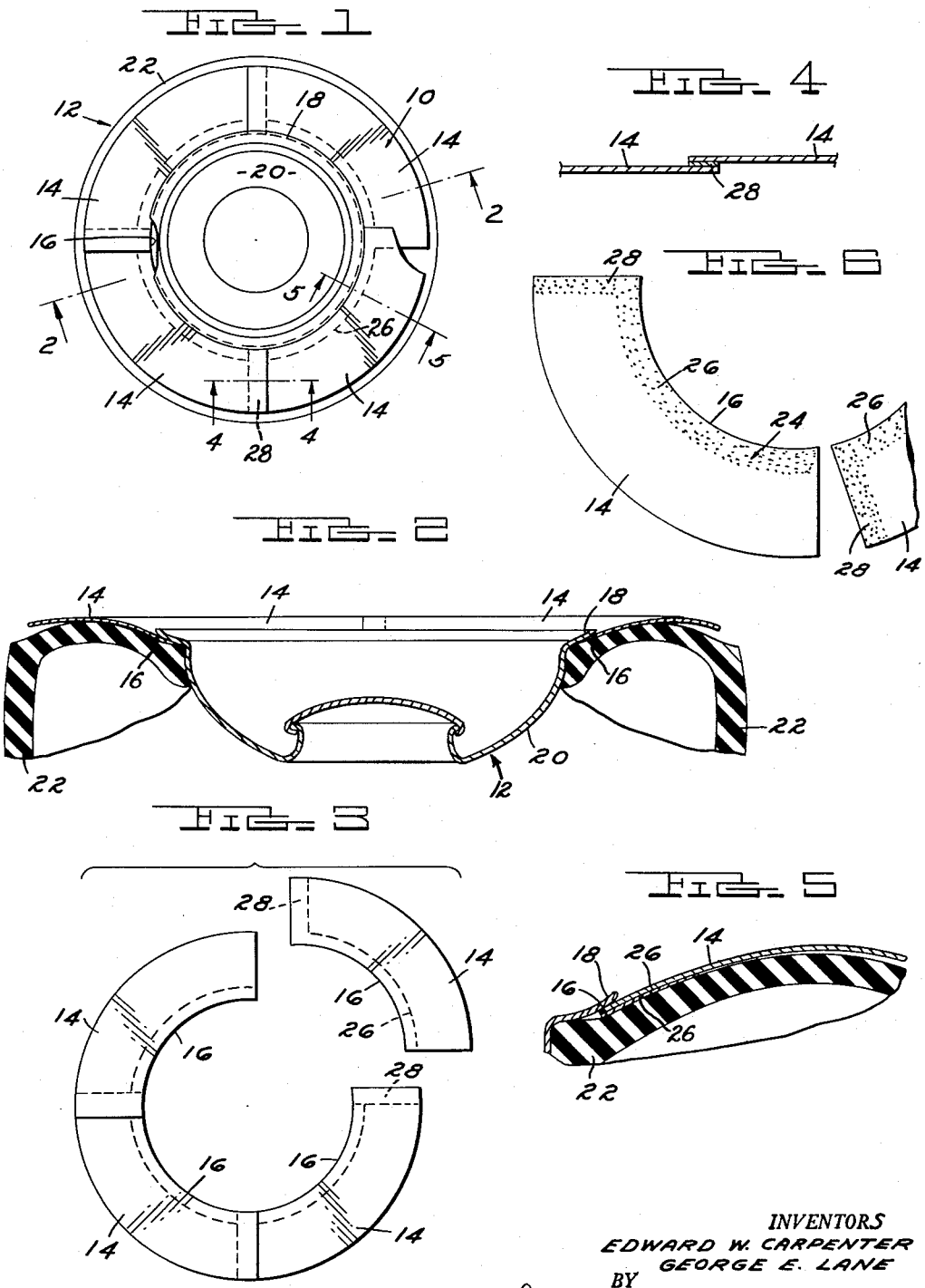

2,996,041
SECTIONAL MASKING DEVICE
Edward W. Carpenter, 35318 Main St., and George E. Lane, 34811 Ash St., both of Wayne, Mich.
Filed May 11, 1959, Ser. No. 812,160
4 Claims. (Cl. 118—505)

This invention relates generally to masking devices, and refers more particularly to sectional masking devices adapted to be applied to one side of a tire of a vehicle wheel to cover and thereby protect said one side of the tire from paint applied to the adjacent sides respectively of a central body portion and rim of said wheel.

Repainting and touching-up automotive and other vehicle wheels require a great deal of preparation for the masking of parts of the vehicle wheel that are not supposed to be painted or parts that are required to be painted a different color. The usual procedure is to use common wrapping paper, or newspaper, and masking tape to hold it in place. While such procedure is inexpensive with regard to the materials that are employed, it is not so with regard to the time and labor required to mask certain parts of the vehicle wheel.

Vehicle wheels present such a problem because of the tire which must be protected from paint splatter and because of its torous shape which makes masking more difficult. Different automotive vehicles have different size wheels and tires of different side wall configurations, hence it is difficult to use any standardized wheel masking device. A further difficulty is experienced when fastening any wheel masking device in place, particularly with disk type wheels.

It is an object of this invention to provide a paint masking device adapted for use when spray painting the central area of a circular part, such as the central area or body portion of a vehicle wheel.

It is also an object of this invention to provide a masking device which may be formed of disposable and inexpensive materials.

Another object of this invention is to provide an annular masking device which may be made in sections or sectors and may be used in painting areas of different inner peripheral sizes.

Still another object of this invention is to provide an annular masking device which may be made of identical sections or sectors and which in combination will provide an annular mask of variable size.

A further object of this invention is to provide a simple, inexpensive and expedient means for connecting together the sections or sectors of the proposed masking device and enabling them to more adequately serve their intended purpose.

These and other objects and advantages in the practice of this invention will be further appreciated upon a reading of the following specification in regard to a working embodiment of this invention, with reference to the accompanying drawing.

In the drawing:
FIGURE 1 is an elevational view of the masking device of this invention installed on a vehicle wheel, with parts broken away.
FIGURE 2 is an enlarged cross-sectional view through the wheel and masking device illustrated in FIGURE 1, and has been taken on the line 2—2 of FIGURE 1.
FIGURE 3 is a composite view of the masking sections, showing three such sections connected together, and showing one section separated from the others.
FIGURE 4 is an enlarged cross-sectional view through the overlapping ends of two masking sections, and has been taken on the line 4—4 of FIGURE 1.
FIGURE 5 is an enlarged fragmentary cross-sectional view through the wheel and one of the masking sections, and has been taken on the line 5—5 of FIGURE 1.
FIGURE 6 is an enlarged bottom plan view of two separated masking sections, with a portion of one of said sections broken away.

In FIGURE 1, the proposed annular masking device 10 is shown in use on a vehicle wheel 12. The masking device 10 comprises four annular quadrant sectors or sections 14. Each of the sectors 14 has its inner peripheral edge 16 engaged under the tire retaining rim 18 of the wheel body 20. Further, each sector 14 is of a width sufficient to adequately shield and protect the vehicle tire 22 from paint splatter in the course of painting the wheel body 20.

As shown in FIGURE 2, the vehicle wheel 12 comprises the dished central body portion 20 which has a tire retaining rim 18 provided at its outer periphery. The vehicle tire 22 is engaged behind the rim 18. Since it is the wheel body 20 which is to be painted, and the tire 22 which is to be protected, the annular sectors 14 have their inner peripheral edge 16 engaged under the rim 18 and between the rim edge and the tire.

Each masking sector 14 is made of a thin, light weight material and preferably of a disposable though reasonably durable material, such as heavy paper or light weight paste board. This cuts the cost of the masking device appreciably and greatly simplifies and expedites its removal since it may be torn off and thrown away.

It will be appreciated that in having the masking device 10 formed of quadrant sectors 14, or any other equal part of a circle, that each is exactly alike. Accordingly, only one form of sector 14 is required to be made, each sector being interchangeable, and any damage to one merely requires the substitution of another in its place.

Each of the masking sectors 14 has a longitudinally extending adhesive coated area 24 on the underside thereof near its inner peripheral edge 16, as at 26, and has a transversely extending adhesive coated area on the underside thereof at least at one end thereof, as at 28. This may be a wettable adhesive, a dry contact adhesive, or whatever proves most suitable.

The adhesive coated area 26 is applied to the tire 22 adjacent the wheel rim 18, as shown in FIGURE 5, to assure retention of the inner peripheral edge 16 of the masking sectors 14 under the wheel rim 18. As noted by FIGURE 5, the adherence of the masking sector 14 to the tire 22, immediately adjacent the wheel rim 18, more fully exposes the rim for painting.

The adhesive coated area 28 at an end of each sector 14 enables the respective sectors to be connected together. In the course of installation, an adhesive coated area 28 at an end of each sector 14 is arranged to overlap an end of the next adjacent sector. This arrangement not only closes any paint receptive gap between adjacent sectors but also serves to bond the sectors into a full annular form of a fixed size. Once the ends of the sectors 14 are all connected together, the resulting annular masking device can not be inadvertently disengaged from under the wheel rim 18. Not only does the adhesive coated area 26 prevent such disengagement, but so too does the fixed size of the inner peripheral dimension of the completed masking device once the ends are connected together.

Although not shown, it will be appreciated that both ends of the sectors 14 may include adhesive coated areas similar to the coated area 28, if desired. This would serve to make the sectors 14 more universally usable, and not require that one particular end overlap another of the next adjacent sector. Further, such adhesive coated areas could be applied directly to the tire 22 and thus would provide a radial bond thereto to cooperate with the adhesive coated areas 26 to retain the masking device in proper masking position.

The pliable nature of the material used to form the sectors 14, and their sector shape, enable them to be applied readily to a curved or rounded surface of a tire 22. Accordingly, the masking device 10 can be employed as described despite the protrusion of the side wall of tire 22 laterally outward beyond the wheel rim 18.

What we claim as our invention is:

1. A sectional masking device adapted to be applied in substantially surface to surface relation to a side wall of a resilient tire when the latter is in assembled relation with laterally spaced retaining rims therefor at the outer periphery of a vehicle wheel body; comprising a plurality of separate preformed longitudinally curved elongated flexible strips of paper-like material, each of said strips having free opposite ends and substantially concentric longitudinally curved inner and outer edges extending between and terminally connected to said free ends, the free ends of adjacent strips being adapted to be overlapped so that said strips collectively will form an annulus, the width and length of said strips being such that when the free ends thereof are overlapped to form an annulus as aforesaid the surface area of said annulus substantially conforms in area to the side wall aforesaid of said tire, the inner longitudinally curved edges of said strips being thin enough to be inserted between the side wall aforesaid of said tire and an adjacent retaining rim to thereby form a pilot for and permit the undersides of said strips to be disposed in surface to surface masking relation with said side wall, the underside of each strip being provided adjacent one longitudinally curved edge thereof and adjacent one end thereof with adhesive coatings respectively to be adhered to the side wall aforesaid of said tire and to the outer side of an adjacent strip at one end thereof when the free ends of said strips are overlapped as aforesaid, whereby adjacent strips will be adhered to each other to form the annulus aforesaid, and said strips will be held against accidental displacement from each other and from said tire when in masking relation with the side wall of said tire.

2. The masking device described in claim 1, wherein the adhesive coatings respectively on the underside of each strip are interconnected with one another at one end of each strip and respectively extend throughout the length of one longitudinally curved edge and completely across said one end of each strip.

3. The masking device described in claim 1, wherein the adhesive coatings respectively on the underside of each strip are interconnected with one another at one inner corner of each strip and respectively extend throughout the length of the inner longitudinally curved edge and completely across one end of each strip.

4. The masking device described in claim 1, wherein said strips are similar in construction and are interchangeable.

References Cited in the file of this patent

UNITED STATES PATENTS

| | | |
|---|---|---|
| 1,726,744 | Krug | Sept. 3, 1925 |
| 1,779,588 | Doty et al. | Oct. 28, 1930 |
| 1,843,432 | Nickerson | Feb. 2, 1932 |
| 2,188,099 | Drew | Jan. 23, 1940 |
| 2,835,222 | Hall | May 20, 1958 |